Patented Mar. 3, 1936

2,032,679

UNITED STATES PATENT OFFICE 2,032,679

SUCCINIC ACID ESTERS OF 2-ETHYL-HEXANOL-1 AND THEIR PRODUCTION

Jacob N. Wickert, Charleston, W. Va., assignor to Carbide and Carbon Chemicals Corporation, a corporation of New York No Drawing. Application March 31, 1933, Serial No. 663,854

3 Claims. (Cl. 260—106)

This invention relates to a new composition of matter comprising esters of 2-ethylhexanol-1, and especially to those formed by the reaction of 2-ethylhexanol-1 with succinic acid.

These esters are characterized by having relatively high boiling points and low vapor pressures at atmospheric conditions. They are solvents for nitrocellulose and other substances used in the preparation of protective coatings. At ordinary room temperature they are quite stable and are not miscible with water.

The compounds may be prepared by esterifying 2-ethylhexanol-1 with succinic acid in the presence of catalytic proportions of sulfuric acid in such a manner as to remove continuously the water formed by the reaction. As illustrative of my invention the following example is given:

Example

Redistilled 2-ethylhexanol-1 was mixed with succinic acid in the ratio of 2.2 mols. of the alcohols per mol. of acid. To this mixture was added a catalytic proportion of sulfuric acid, and enough benzene to serve as a dehydrating agent. This mixture was heated to boiling under a short distilling column connected to a condenser. The condensate was collected in a decanter and the top (benzene) layer was returned to the distilling flask continuously so long as any water separated from the distillate. When no more water could be removed, the benzene was distilled off and the residue was washed with an excess of 10% sodium carbonate solution to remove any acidic substances in it. This purified material was distilled at 4 mm. of mercury absolute pressure. After a small heads cut, the main part of the product distilled at 206° C.–208° C. at 4 mm. of pressure. It had a specific gravity of 0.9336 at 20° C. This was di-2-ethylhexyl succinate. Practically quantitative yields were obtained.

In the above example the succinic acid is completely esterified with the 2-ethylhexanol-1. It may also be desirable to esterify only one carboxyl group with this alcohol, in which case another aliphatic alcohol can be reacted with the second carboxyl group, to give a substantially neutral ester. These modifications are intended to be included within the invention, which provides a group of esters useful as solvents in protective coating compositions, or as plasticizers and stabilizers in conjunction with both natural and synthetic resins.

I claim:—

1. As a chemical compound, a succinic acid ester of 2-ethylhexanol-1.

2. As a chemical compound, di-2-ethylhexyl succinate having a boiling point of about 206° C. to 208° C. at 4 mm. of mercury pressure, and a specific gravity of about 0.9336 at 20° C.

3. A process for making a succinic acid ester, which comprises heating the acid with 2-ethylhexanol-1 in the presence of catalytic proportions of sulfuric acid, whereby at least one carboxylic hydrogen is replaced by a 2-ethylhexyl group.

JACOB N. WICKERT.